(12) United States Patent
Jayapalan et al.

(10) Patent No.: US 11,140,268 B1
(45) Date of Patent: *Oct. 5, 2021

(54) LEARNING BASED METRIC DETERMINATION AND CLUSTERING FOR SERVICE ROUTING

(71) Applicant: United Services Automobile Association (USAA), San Antonio, TX (US)

(72) Inventors: Vijay Jayapalan, San Antonio, TX (US); Gregory Yarbrough, San Antonio, TX (US); Bipin Chadha, Phoenix, AZ (US); John McChesney TenEyck, Jr., San Antonio, TX (US); Eric J. Smith, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,289

(22) Filed: Jun. 8, 2020

Related U.S. Application Data

(63) Continuation of application No. 15/906,254, filed on Feb. 27, 2018, now Pat. No. 10,715,668.

(Continued)

(51) Int. Cl.
*H04M 3/00* (2006.01)
*H04M 5/00* (2006.01)
(Continued)

(52) U.S. Cl.
CPC ............ *H04M 3/523* (2013.01); *G06N 3/088* (2013.01); *H04M 2203/401* (2013.01); *H04M 2203/408* (2013.01)

(58) Field of Classification Search
CPC ............ H04M 3/5191; H04M 3/5175; H04M 3/42221; H04M 3/5183; H04M 2201/40;
(Continued)

(56) References Cited

U.S. PATENT DOCUMENTS 8,615,074 B1 12/2013 Rivier et al.
8,855,292 B1 10/2014 Brunson
(Continued)

OTHER PUBLICATIONS

U.S. Non-Final Office Action Issued in U.S. Appl. No. 15/616,643, dated Nov. 2, 2018, 7 pages.
(Continued)

*Primary Examiner* — Ahmad F. Matar
*Assistant Examiner* — Kharye Pope
(74) *Attorney, Agent, or Firm* — Fish & Richardson P.C.

(57) ABSTRACT

Techniques are described for generating metric(s) that predict survey score(s) for a service session. Model(s) may be trained, through supervised or unsupervised machine learning, using training data such as communications from previous service sessions between service representative(s) and individual(s), and survey scores provided by the serviced individual to rate the session on one or more criteria (e.g., survey questions). The model(s) may be trained to output, based on an input session record, metric(s) that each correspond to a survey score that would have been provided by the individual had they completed the survey. The model may be a concatenated model that combines a language model output from a language classifier recurrent neural network, and an acoustic model output from an acoustic feature layer convolutional neural network. Individuals can be clustered according to the metric(s) and/or other factors, and the cluster(s) can be employed for routing incoming service requests.

20 Claims, 8 Drawing Sheets

Related U.S. Application Data

(60) Provisional application No. 62/463,833, filed on Feb. 27, 2017.

(51) Int. Cl.
  *H04L 12/66* (2006.01)
  *H04M 3/523* (2006.01)
  *G06N 3/08* (2006.01)

(58) Field of Classification Search
  CPC .. H04M 3/5232; H04M 3/5233; H04M 3/493; H04M 2203/40; H04M 3/523; H04M 3/2218; H04M 3/5166; G06Q 30/016; G06Q 30/0203; G06Q 10/06398; G06Q 10/06375; G06Q 10/067; G06Q 10/063112; G06Q 10/0639; G06Q 10/06393; G10L 15/26; G10L 15/1822; G10L 25/63; G10L 17/26; G06F 17/2785; G06F 17/20; G06F 16/3329; G06F 16/3344
  USPC ............ 379/265.02, 265.06, 265.01, 265.09, 379/266.01; 705/304, 7.42, 7.41, 7.13; 704/E15.026, E15.045, 9
  See application file for complete search history.

(56) References Cited

U.S. PATENT DOCUMENTS

| | | | |
|---|---|---|---|
| 9,728,185 B2 | 8/2017 | Schalkwyk et al. | |
| 9,881,615 B2 | 1/2018 | Choi | |
| 10,019,438 B2 | 7/2018 | Audhkhasi et al. | |
| 2006/0262922 A1 | 11/2006 | Margulies et al. | |
| 2008/0167952 A1 | 7/2008 | Blair | |
| 2009/0089135 A1 | 4/2009 | Minert et al. | |
| 2010/0138282 A1 | 6/2010 | Kannan et al. | |
| 2010/0332287 A1 | 12/2010 | Gates et al. | |
| 2011/0137696 A1 | 6/2011 | Meyer et al. | |
| 2011/0251871 A1 | 10/2011 | Rogers et al. | |
| 2012/0047000 A1 | 2/2012 | O'Shea et al. | |
| 2012/0101865 A1 | 4/2012 | Zhakov | |
| 2014/0143018 A1 | 5/2014 | Nies et al. | |
| 2014/0249873 A1 | 9/2014 | Stephan et al. | |
| 2014/0316862 A1 | 10/2014 | Panda et al. | |
| 2015/0134404 A1 | 5/2015 | Gustafson et al. | |
| 2015/0170295 A1 | 6/2015 | Shen et al. | |
| 2015/0178371 A1 | 6/2015 | Seth et al. | |
| 2015/0189088 A1 | 7/2015 | Surridge et al. | |
| 2016/0078142 A1 | 3/2016 | Gorny | |
| 2016/0086125 A1 | 3/2016 | Hanrahan et al. | |
| 2016/0189558 A1 | 6/2016 | McGann et al. | |
| 2016/0352900 A1 | 12/2016 | Bell et al. | |
| 2017/0024640 A1 | 1/2017 | Deng | |
| 2017/0256254 A1 | 9/2017 | Huang | |
| 2017/0316438 A1 | 11/2017 | Konig et al. | |
| 2018/0061439 A1 | 3/2018 | Diannos | |
| 2018/0144749 A1 | 5/2018 | Choi | |
| 2018/0225602 A1 | 8/2018 | Johnson et al. | |
| 2018/0270354 A1 | 9/2018 | Piaggio | |
| 2018/0358005 A1 | 12/2018 | Tomar et al. | |

OTHER PUBLICATIONS

U.S. Non-Final Office Action Issued in U.S. Appl. No. 15/906,254, dated Apr. 19, 2019, 14 pages.

LEARNING BASED METRIC DETERMINATION AND CLUSTERING FOR SERVICE ROUTING

CROSS-REFERENCE TO RELATED APPLICATIONS

This application is a continuation application of and claims priority under 35 U.S.C. § 120 to U.S. application Ser. No. 15/906,254, filed on Feb. 27, 2018, which is related to, and claims priority to, U.S. Provisional Patent Application No. 62/463,833, titled "Learning Based Metric Determination for Service Sessions," which was filed on Feb. 27, 2017, the entirety of which is incorporated by reference into the present disclosure. The present disclosure is also related to U.S. patent application Ser. No. 15/616,643, titled "Learning Based Metric Determination for Service Sessions," which was filed on Jun. 7, 2017, now U.S. Pat. No. 10,440,180, the entirety of which is incorporated by reference into the present disclosure.

BACKGROUND

An organization may use any number of computing systems, communications networks, data storage devices, or other types of systems to provide service to individuals. An organization may also employ service representatives that use the various systems to assist individuals in service sessions that are conducted over the telephone, in a video conference, through text chat sessions, in person, and/or over other communication channels. Organizations may strive to provide an efficient and productive service interaction between service representatives and the individuals being serviced, while maintaining an appropriate quality level for the service provided by service representatives.

SUMMARY

Implementations of the present disclosure are generally directed to routing service requests. More specifically, implementations are directed to using machine learning techniques, such as deep learning that includes classification, clustering, and/or other techniques, to determine metric(s) for a service session, the metric(s) providing a prediction of survey scores that would be submitted by serviced individuals in a post-session survey, clustering users based at least partly on the determined metric(s), and routing incoming service requests based on the clustering.

In general, innovative aspects of the subject matter described in this specification can be embodied in methods that includes actions of: receiving a session record of communications between a service representative (SR) and an individual during a service session in a service environment; providing the session record as input to at least one computer-processable model that determines, based on the session record, at least one metric for the service session, the at least one model having been trained, using machine learning and based at least partly on survey data for previous service sessions, to provide the at least one metric that is a prediction of at least one survey score for the service session; determining a cluster for the individual based at least partly on the at least one metric, the cluster including a plurality of individuals having at least one similar metric determined by the at least one model; in response to receiving a subsequent service request from the individual within the service environment, selecting at least one SR based on the cluster of the individual; and initiating a subsequent service session between the individual and the at least one SR that is selected based on the cluster of the individual.

Implementations can optionally include one or more of the following features: the cluster is further determined based on the plurality of individuals in the cluster having a similarity in one or more of: a product discussed by the individuals during service sessions; a location of the individuals; and a characteristic of the individuals; the at least one SR is selected based on determining that individuals in the cluster each have a respective metric that exceeds a threshold value and that is determined, by the at least one model, based on a respective session record of communications between the respective individual and the at least one SR; the at least one SR is selected based on determining that an average metric for individuals in the cluster exceeds a threshold value, the average metric being an average of metrics that are determined, by the at least one model, based on session records of communications between the individuals and the at least one SR; the service session is an audio call between the SR and the individual; the session record includes an audio record of at least a portion of the audio call; the operations further include developing the at least one model based on training data that describes, for each of a plurality of previous service sessions: a previous session record of communications during a respective previous service session; and at least one survey score provided to rate the respective previous service session; the operations further include receiving the at least one survey score provided, by the individual, to rate the service session; the operations further include employing the at least one survey score and the session record to further train the at least one model; the at least one model is trained to identify a plurality of features present in the session record; each of the at least one metric is determined based on a strength of one or more corresponding features present in the session record; the machine learning is deep learning in which a separate model is trained to identify each of the plurality of features; the at least one model is a concatenated model that is a combination of a language model and an acoustic model; the language model is output from a language classifier recurrent neural network (RNN); and/or the acoustic model is output from an acoustic feature layer convolutional neural network (CNN).

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Through use of machine learning developed models to determine metrics that are predicted survey results, implementations provide a technique to determine survey results in a service environment even in instances when the individual being serviced does not complete a survey. Moreover, the model(s) enable an objective determination of survey results across a wider range of individuals than would ordinarily complete survey results, thus providing more accurate, objective, and comprehensive view of the service provided in a service environment. By providing more accurate survey results through use of predictive modeling, implementations may avoid repeatedly requesting that individual(s) complete surveys following a service session, thus avoiding the expenditure of processing power, network bandwidth, storage space, active memory, and/or other computing resources that may be expended in traditional service environments. In instances where the predictive model(s) are sufficiently developed to enable session metric(s) to be determined without surveying individuals, implementations also avoid the expenditure of computing resources that would otherwise be consumed to survey individuals following a service session.

Moreover, in service environments such as call centers, traditional call routing may involve a number of administrators who determine which service representative is to receive and handle a particular call from a customer. Moreover, traditional call routing systems (either automatic or manual) may be prone to errors in which requests are misrouted, and subsequently require one or more rerouting operations to attempt to find the appropriate service representative to service a request. Implementations address these problems by routing incoming service requests based on clusters of users, where such clustering is based on the machine learning generated metrics that are predictions of survey scores. Such clustering based routing provides for more accurate routing of requests, with less need to reroute compared to traditional solutions. Accordingly, implementations do not consume the processing power, memory, and/or other computing resources that traditional systems consume to recover from errors in routing and/or re-routing of requests following an erroneous routing decision.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
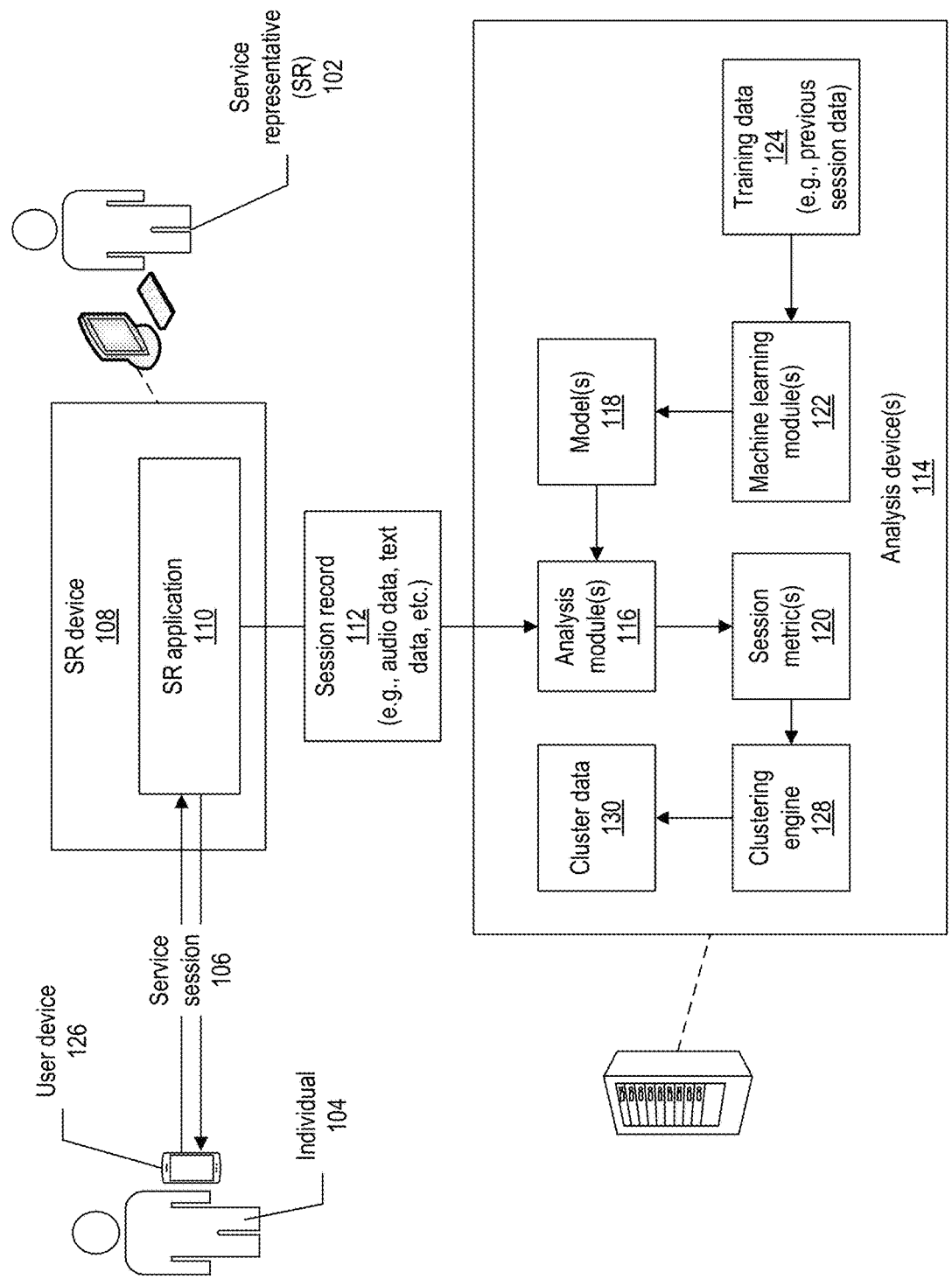
FIG. 1 depicts an example system for determining metric(s) for service session(s), according to implementations of the present disclosure.

Implementations of the present disclosure are directed to systems, devices, methods, and computer-readable media for determining metric(s) that rate characteristic(s) of a service session between a service representative (SR) and an individual (e.g., a customer) in a service environment, determining cluster(s) of individuals based at least partly on the determined metric(s), and routing incoming service requests based at least partly on the clustering. In a service environment, such as a call center environment, one or more SRs may assist individual(s) who need assistance with various questions and/or problems. For example, a call center for a product providing organization may operate a call center to answer questions from customers who use the product(s) provided by the organization. A service session between a SR and an individual may also be described as a call, such as in instances when the session is conducted over a telephone call, voice chat session, or other communication session that includes audio communications.

Traditionally, following the service session, the individual who was participating in the session may complete a survey to answer questions regarding the service session. For example, a survey may ask whether the individual was satisfied with the service provided by the SR during the service session, whether the individual is satisfied with the product that was the subject of the service session, whether the individual was satisfied with the service environment used to provide the service session, and so forth. In instances where the service session was conducted as an audio call (e.g., telephonically), the survey questions may be presented to the individual as audio output (e.g., generated speech), and the individual may respond by speaking an answer. Although individuals serviced in the service environment may be given the opportunity to complete a survey, not all the individuals may opt to do so, given the time and effort involved. Moreover, an individual may be more likely to complete a survey if the individual is angry or dissatisfied with the service provided. Accordingly, the completed surveys in a traditional service environment may be provide an incomplete view of the overall quality of the service, and may be skewed toward more negative surveys. Given such shortcomings in a traditional environment, it may be difficult for an organization to develop objective and accurate knowledge regarding the quality of the service being provided.

Implementations provide a technique for generating metric(s) that predict survey score(s) for a service session, such as in instances where the individual being serviced does not complete a survey following the service session. One or more models may be developed using machine learning (ML), as described further below. In some implementations, model(s) may be trained, through supervised ML, using training data from previous service sessions between SR(s) and individual(s) in the service environment. Training data may include, for each of one or more previous service sessions, a session record of the session and a set of survey scores provided by the serviced individual to rate the session on one or more criteria (e.g., survey questions). The model(s) may be trained to output, based on an input session record, metric(s) that each correspond to a survey score that would have been provided by the individual had they completed the survey. Accordingly, some implementations provide predicted survey results in instances where the serviced individual does not complete a survey, and thus provide for a more complete set of survey results associated with a larger subset (or all) of the individuals serviced within a call center or other service environment. Moreover, once the model(s) are sufficiently trained and/or refined to provide accurate estimates of survey results, fewer (or no) serviced individuals may be asked to complete a survey, thus providing a more positive user experience for individuals serviced through the call center or other service environment.

In some implementations, the generated metric(s) are used to determine one or more clusters of individuals. For example, a suitable clustering algorithm can be employed to generate clusters of individuals in which each cluster includes a set of individuals for whom one or more of the generated metrics are similar across the individuals in the cluster. Clustering can be further based on other information regarding the individuals, such as the topic of their calls to the service environment (e.g., the product or service they are seeking help regarding), the location of the individuals (e.g., geographic location), demographic or other characteristics of the individuals (e.g., age, gender, etc.), and/or other information. The cluster of an individual can be employed to determine how to route subsequent service requests from that individual to one or more appropriate SRs. For example, a particular cluster of individuals may exhibit high (e.g., above-threshold) metrics for their service sessions with one or more particular SRs. Accordingly, subsequent service requests from members of that cluster may be routed to the particular SR(s) for which the previous metrics showed high predicted scores (e.g., indicating high quality of service and/or customer satisfaction).

FIG. 1 depicts an example system for determining metric(s) for service session(s), according to implementations of the present disclosure. As shown in FIG. 1, a SR 102 may communicate with an individual 104 (e.g., a customer) during a service session 106. A SR 102 and an individual 104 may participate in a service session 106 in which the SR 102 attempts to assist the individual 104 with respect to products and/or services provided by an organization that employs or otherwise includes the SR 102. A service session 106 may include any number of communications between an individual 104 and a SR 102. In some examples, a service request (e.g., question, complaint, inquiry, etc.) may be received from an individual 104 via a telephone call, a real-time chat session, text message, email, or other communications channel. A SR 102 may respond to the service request via a voice response, text response, or otherwise. The individual 104 may submit any number of follow-up questions, and the SR 102 may respond in turn. Accordingly, a service session 106 may constitute a conversation between the individual 104 and the SR 102 that includes any number of communications sent between the parties over any period of time. The service session 106 may begin when the individual 104 initially submits a service request and/or when the SR 102 initially responds to the service request. In some examples, the SR 102 may initiate the service session 106 by sending an initial communication to the individual 104.

The individual 104 (e.g., customer) may employ a user device 126 to send and receive communications during the service session 106. The user device 126 may include any suitable type of computing device, such as a personal computer, laptop computer, tablet computer, smartphone, wearable computer, and/or other types of computing devices. The user device 126 may execute a user application that enables the individual 104 to send and receive communications during the service session 106, or otherwise participate in the service session 106.

The SR 102 may employ a SR device 108, which may include any suitable type of computing device. The SR device 108 may execute a SR application 110 that facilitates the SR's communications with the individual 104 during service session(s) 106. For example, the SR application 110 may provide voice telephony services and/or audio/video chat functionality that enables the SR 102 to engage in a voice and/or video conversation with the individual 104. As another example, the SR application 110 may provide real time (e.g., chat) functionality, that enables the SR 102 to exchange text messages with the individual 104. In some instances, a service session 106 may include multiple types of communication, including audio (e.g., voice) communication, communicated text data, and/or shared viewing of documents, such as text documents, images, graphics, video, and so forth.

In some implementations, a session record 112 may be generated for each of one or more service sessions 106. The session record 112 may describe various communications (e.g., voice, text, or otherwise) sent by the SR 102 and/or the individual 104 during the service session(s) 106. In some implementations, where the service session 106 is conducted as a voice telephony conversation, video chat session, and/or audio chat session using a telephone network, voice over internet protocol (VOIP), streaming video and/or audio, or other communication protocols, the session record 112 includes audio data that is a recording of at least a portion of the service session 106. In some instances, the session record 112 includes a text transcript that is generated using a speech-to-text (STT) algorithm, based on the audio data of the service session 106. In implementations where the service session 106 is conducted as a text chat session over a social network, instant messaging (IM) connection, SMS or MMS messages, and so forth, the session record 112 may include at least a portion of the text data exchanged between the individual 104 and SR 102 participating in the service session 106.

The session record 112 may be communicated, over one or more networks, to one or more analysis devices 114 that execute one or more analysis modules 116. The analysis device(s) 114 may include any suitable number and type of computing device, such as server computer(s), distributed computing device(s) (e.g., cloud server(s)), and so forth. In some instances, the session record(s) 112 may be collected by the SR application(s) 110 executing during one or more service sessions 106, stored on the SR device(s) 108, and sent to the analysis device(s) 114 in a batch. Alternatively, the session record 112 of a service session 106 may be sent (e.g., in real time) to the analysis device(s) 114 following the completion of the service session 106. In some instances, the service record 112 may be generated by some other process, other than the SR application 110, that monitors the communications during the service session(s) 106 and generates the session record(s) 112 based on the communications.

The session record 112 may include text data if the service session 106 is being conducted as a text chat session or some other exchange of messages that include text. The session record 112 may include audio data if the service session 106 is being conducted as a voice chat, audio chat, or video conference session using a telephone network, a VOIP service, a video chat service, and so forth. In scenarios where the service session 106 is a video chat session, the session record 112 may include individual frame image(s) or video stream data of the SR's and/or individual's face. Audio data included in the session record 112 (e.g., collected during a voice and/or video chat session) may be transcribed using STT software to generate text data based on the audio data.

The analysis module(s) 116 may analyze the session record 112 to determine one or more session metrics 120 that each measures a characteristic of the session 106. The session metric(s) 120 may be stored in persistent memory (e.g., data storage) on the analysis device(s) 114 or elsewhere. In some implementations, the session metric(s) 120 may be communicated, over one or more networks, to a computing device, to cause the computing device to display the metric(s) 120 through a user interface (UI), such as the UI of the SR application 110 or some other application. In some implementations, the session record 112 may be generated and analyzed in real time during a service session 106 between a SR 102 and an individual 104 to determine session metric(s) 120. In some implementations, the session record 112 may be generated (e.g., recorded or otherwise captured) and stored during a service session 106. The session record 112 may be later transmitted to the analysis device(s) 114 analyzed to determine the session metric(s) 120.

Implementations support various formats for session metric(s) 120. In some implementations, the session metric(s) 120 may be numeric values that range on a scale from a minimum to a maximum value. For example, the session metric(s) 120 may each range from 0 to 10, where 0 indicates minimum (e.g., worst) rating for a particular characteristic of the session 106, and 10 indicates maximum (e.g., best) rating.

In some implementations, one or more of the generation of the session record 112, the analysis of the session record 112, the determination of metric(s) 120, and/or the communication and display of the metric(s) 120 may be performed in real time with respect to the completion of the service session 106, or in real time during the service session 106. A real time operation may refer to an operation that is performed in response to detecting some triggering event or state, such that the operation is performed without undue delay following the triggering event or state, taking into account the time spent to communicate and/or process the data. The operation may be performed, or at least initiated, within a short period of time following the triggering event or state. In some instances, the operation may be performed as part of a same execution path as a process that detects the triggering event or state.

The model(s) 118 may be developed (e.g., trained) and/or updated (e.g., retrained and/or refined) through operations of one or more ML modules 122 executing on the analysis device(s) 114 or elsewhere. The ML module(s) 122 may develop and/or update the model(s) 118 using training data 124, including historical data collected regarding previously completed service sessions 106.

In some implementations, the analysis device(s) execute a clustering engine 128 that generates cluster data 130 to be used in subsequent routing decisions. The clustering engine 128 can determine a cluster for an individual based on their session metric(s), such that a cluster includes individuals that exhibit similar values for one or more metrics (e.g., values within a particular range of one another, and/or exhibiting at least a threshold statistical similarity). The cluster for a particular individual may be used to route subsequent incoming service requests from the individual, as described further below.

Figure 2:
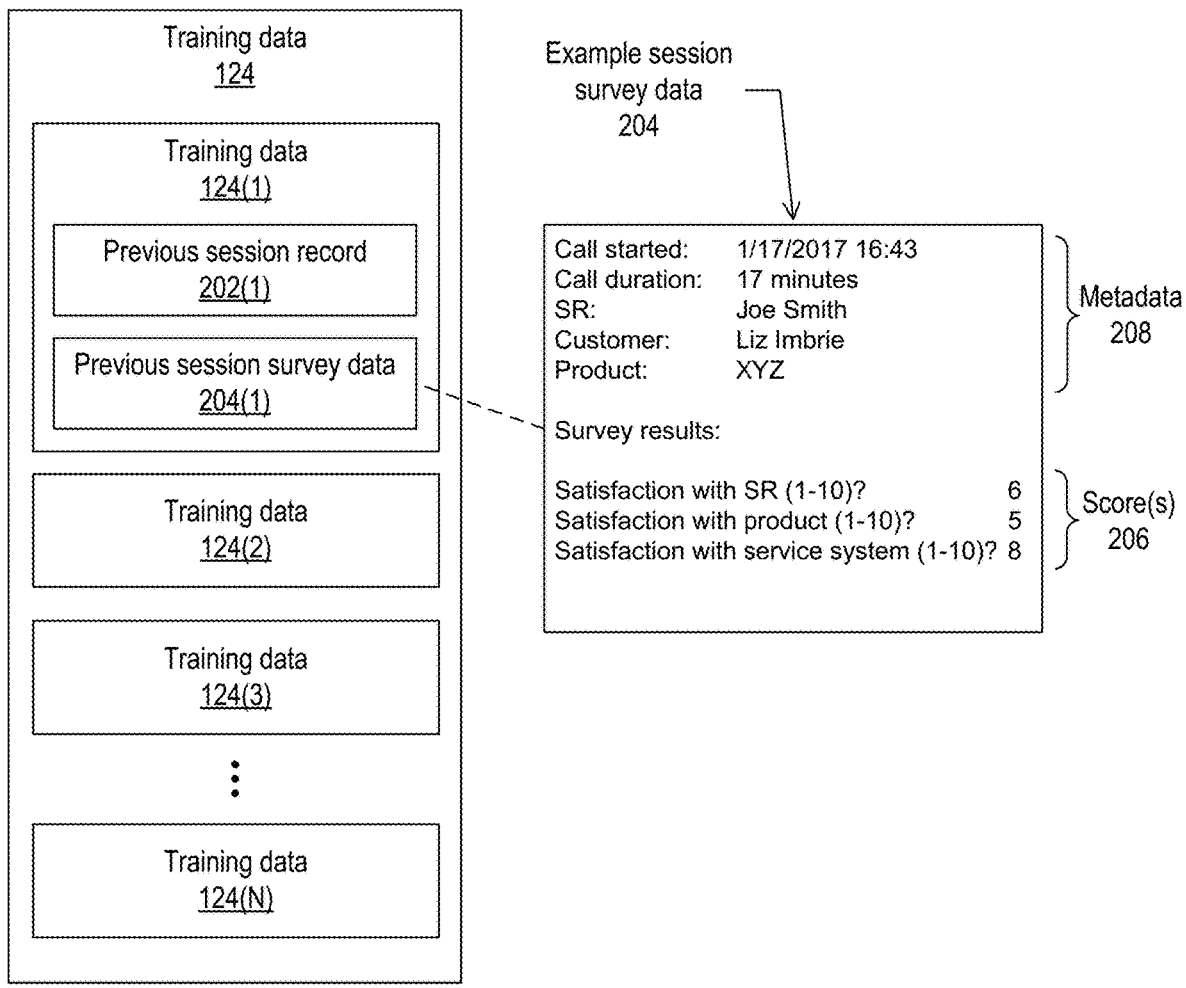
FIG. 2 depicts an example of training data used to provide model(s) for determining metric(s), according to implementations of the present disclosure.

FIG. 2 depicts an example of training data 124 used to generate the model(s) 118 for determining metric(s) 120, according to implementations of the present disclosure. As shown in the example of FIG. 2, the training data 124 may include any suitable number of sets of training data 124(1), 124(2), 124(3), . . . , 124(N). Each set of training data 124 may be associated with a previously conducted and recorded service session, and may include a session record 202 for the previous session, such as audio data, text data, and so forth. The set of training data 124 may also include survey data 204 associated with the previous session. The survey data 204 may include the results of a survey taken by the individual (e.g., customer) who participated in the session.

Implementations are not limited to the particular example of training data 124 shown in FIG. 2, and may include less information, more information, differently formatted information, and so forth. As shown in the example, the survey data 204 for a particular session may include one or more scores 206 that each provides a rating of a particular characteristic of the session, such as whether the individual was satisfied with the SR conducting the session, the product that was the topic of the session, or the service system itself (e.g., the call center or other service environment). In some implementations, as shown in FIG. 2, each score may be a numeric score provided by the individual 104 to rate the corresponding question along a range of possible values (e.g., from 1 to 10).

A survey may include any suitable number of questions, such as 10-12 questions. In one example, a survey asks the individual 104 to provide a score for each of the follow categories: overall satisfaction with the company providing the service; overall satisfaction with the SR; completeness or adequacy of SR knowledge; SR offering appropriate products; SR effectiveness; whether the SR was able to complete the individual's request; whether the individual has called about this request recently (e.g., in the past 30 days); whether the service-providing organization should have completed this request on a prior call; why the service-providing organization was not able to complete the request on a prior call; why the SR was unable to complete the request today; what the serviced individual liked about this call; what the SR and/or service-providing organization could have done to improve the individual's experience. Some of the categories may ask the individual 104 to provide a numeric score (e.g., from 1 to 10). Some of the categories may ask the individual 104 to provide a score that is "yes", "no", or "I do not know." Some of the categories may ask the individual 104 to describe their answer verbally (e.g., through 30-60 seconds of recorded audio). The survey may also ask the individual 104 to give feedback as free-form audio, enabling the individual 104 to elaborate on various issues and/or bring up issues that are not otherwise addressed in the survey.

Survey data from past surveys over a period of time (e.g., months, years, etc.) may be stored along with session records of the various sessions that were the subject of the surveys. In some implementations, ML techniques may be applied to the stored historical survey data, and to the stored historical session records, to develop the model(s) 118. In some implementations, the ML techniques may include deep learning, in which different models may be developed to predict different features in the session records. For example, a neural network and/or classification technique may be used to train a model that is a classifier and that is useable to infer and/or predict answers to survey questions following a service session, such as in instances where the individual 104 did not complete a survey following the session. In some examples, the historical survey data and history session records may be described as labeled training data, where the survey scores provide labels for the corresponding session record.

In some implementations, the applied ML techniques include feature extraction to build different neurons within a neural network, where each neuron corresponds to a feature of the session records. One or more features may translate to one or more survey questions. For example, a particular feature may correspond to a particular survey question, such that the strength of a feature present in a session record leads to a particular metric being determined for the corresponding survey question. Features may correspond to negative and/or positive sentiments expressed by an individual during a session. A feature may correspond to one or more neurons that each indicates a characteristic of the session. In some instances, a feature may correspond to a particular relationship, or interrelationship, between multiple neurons. In some implementations, each feature is associated with a different neural network, or sub-network, of multiple neurons, and the neural network may be developed based on supervised learning using the training data (e.g., labeled data). Unsupervised learning may also be employed. In some instances, the training data may be labeled to reflect the outcome of a session, such as whether the session resulted in a resolution of the problem being discussed, whether the session resulted in the individual purchasing a product, and/or whether the session was followed by additional sessions to attempt to resolve the same issue. Implementations may employ feature engineering, learning curves, anomaly filtering, training algorithm(s), recurrent neural network(s), and/or other techniques.

In some implementations, an acoustic model and a language model may be employed to produce different features that constitute survey characteristics. The acoustic model may be built as a convolutional neural network (CNN), and the language model may be built as a recurrent neural network (RNN).

Figure 5:
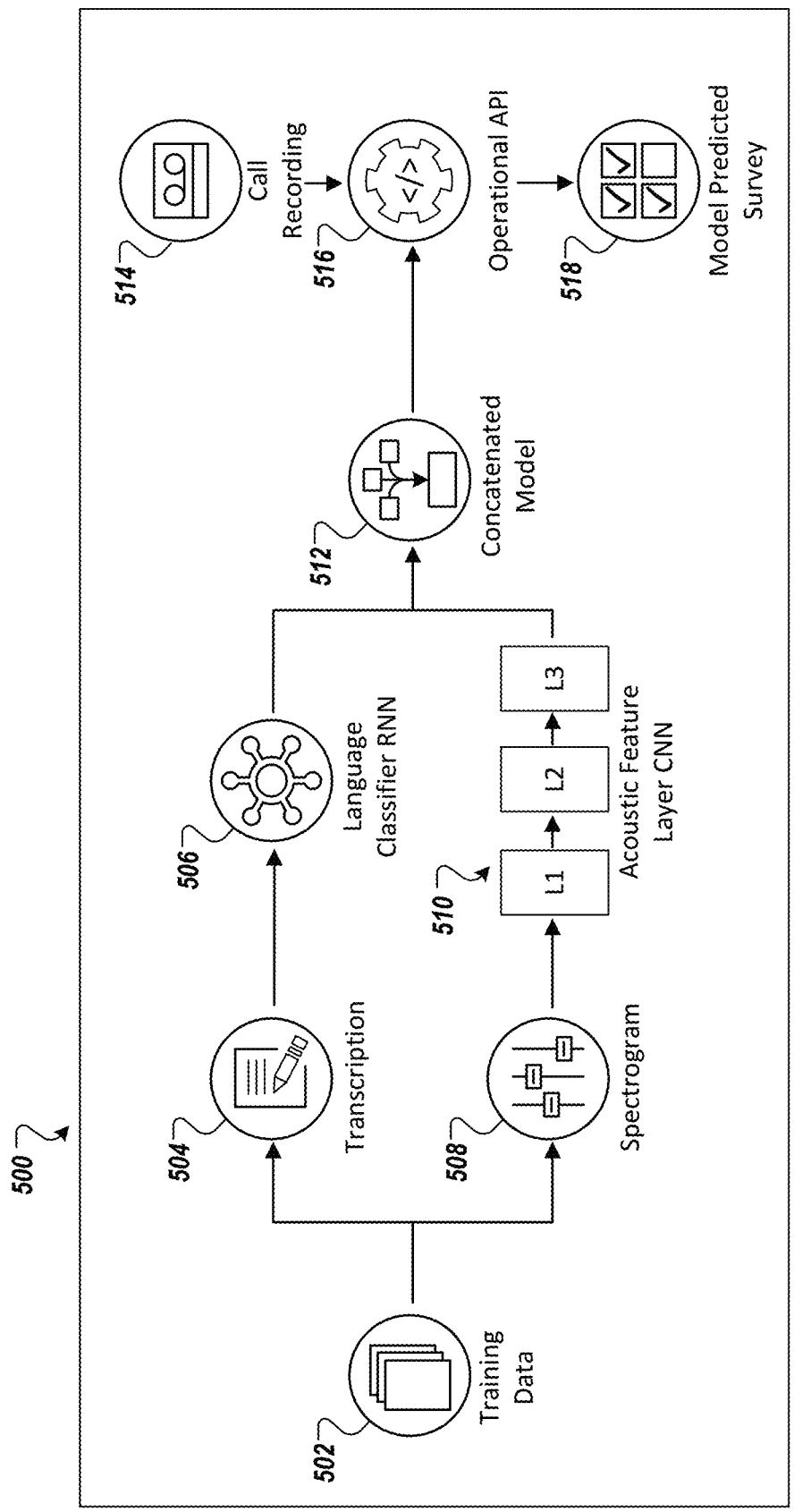
FIG. 5 depicts an example schematic of a system of two neural networks for determining metric(s), according to implementations of the present disclosure.

In some implementations, a concatenated neural network based on the above will be the operational neural network for the survey prediction, as shown in the example of FIG. 5. As shown in the example schematic 500 of FIG. 5, training data 502 may be input to the system. Training data 502 may include call surveys and/or call recordings. Any suitable number of surveys and/or recordings may be employed as training data. For example, approximately 15,000 surveys and 15,000 recordings may be employed. The training data 502 may be provided to a transcription module 504, which transcribes the recordings. The training data 502, at least some of it transcribed, may then be provided to a language classifier RNN 506, which outputs a language model. The training data 502 may also be provided to a spectrogram 508, which analyzes the acoustic properties of the recordings in the training data 502. The output of the spectrogram 508 may be provided to an acoustic feature layer CNN 510, which outputs an acoustic model. The CNN 510 may include any suitable number of layers, each layer modeling a particular acoustic feature or set of acoustic features. The output language model of the RNN 506 and acoustic model of the CNN 510 may be combined into a concatenated model 512. The concatenated model 512 may be employed, through an operational API 516, to analyze call recordings 514 and generate model predicted survey results 518 based on an application of the concatenated model 512 to the call recordings 514.

In some instances, the individual's sentiment (as reflected in the audio data) may exhibit a pattern that changes over the course of a session. For example, an individual may begin a session angry or frustrated, and become calmer and/or more friendly as the session progresses, until an end of the session when the individual and SR are chatting amiably. Accordingly, a model to predict one or more features may take into account this gradient, and may give greater weight or importance to the sentiment exhibited at the end of the session than the sentiment at the beginning of the session. Such a trend may correlate to overall satisfaction features corresponding to the "overall satisfaction" questions that would be answered in a survey. In general, features that are predicted using the model(s) may correspond to survey questions that would be answered by an individual, and the particular metrics that are generated based on the strength of the features may therefore correspond to the survey questions that would be answered by the individual, had the individual completed a survey.

Other types of features may also be predicted or estimated based on the model(s) 118, in addition to, or instead of, predicting survey results for sessions. For example, the model(s) 118 may predict a feature that is the probability of fraud. Such a feature may be modeled using a classifier that is trained using unlabeled data, through an unsupervised training technique. For example, acoustic models of behavior indicate that the possibility that an individual is engaged in fraud is higher if the individual's vocal register increases in pitch as the individual is challenged with questions, whereas an individual engaged in legitimate activate may have their vocal register decrease in pitch as they are challenged. Based on such behavioral patterns, model may be developed to predict the likelihood of fraudulent activity occurring during a session.

Other modeled features may include friction in user experience for the individual, indicating the individual's overall experience using the support environment. For example, friction may indicate how easy, or how difficult, it is for an individual to navigate a call tree in a call center, how easy or difficult it is for an individual to initially connect to the support environment, and so forth. If a model predicts a high likelihood of friction for a particular cluster of individuals, and if an individual who fits into that cluster contacts the service environment, particular efforts may be made to provide a lower friction experience for that individual. Modeled features may also include a close opportunity feature, which indicates how likely the individual is to purchase a product or service that was discussed during the session. If a model predicts a low likelihood of selling a product to a particular cluster of individuals, and if an individual who fits into that cluster contacts the service environment, particular efforts may be made to provide greater incentives for the individual to purchase a product. In some implementations, different features may have different models (e.g., classifiers and/or neural networks) developed to predict the corresponding feature.

In some implementations, a large sample of historical session data (e.g., session records and associated survey results) may be employed to develop the model(s) 118. Such large sample may provide for the development of model(s) 118 that take into account a wide variance, among the historical session, in the call length, the time of day of the call, the time of year of the call, the different characteristics of individuals, the different products and/or issues being discussed, and/or other session characteristics. A goal of the modeling may be to provide estimates or predictions of features, corresponding to survey scores, with at least a threshold degree of accuracy (e.g., at least 90% accurate).

Implementations may also employ unlabeled data to develop the model(s) 118. In some implementations, clustering techniques may be applied to develop model(s) 118 based on unlabeled data. Clustering may determine sets (e.g., clusters) of individuals that are similar in some way with respect to their characteristics, such as the problems they are concerned with, the products they own, the services they use, their wait times in a service queue waiting for a SR, and so forth. Clustering may be described as self-classification without the use of labeled data. In some implementations, clustering may be employed to determine routing decisions within the service environment. For example, some clusters of individuals may be routed to a human SR, whereas other clusters of individuals may be routed to a virtual SR (e.g., an artificial intelligence) for at least initial servicing within the service environment. As another example, certain clusters may be routed to a particular set of human SRs whereas other clusters may be routed to a different set of (e.g., more suitable) human SRs. In some implementations, features may be modeled for other aspects of user interaction of individuals with a service environment. For example, features may model whether particular clusters of individuals prefer a particular workflow within a user interface such as a web site or a mobile application, and/or other individuals prefer a particular landing page (e.g., starting point) to begin navigating a workflow. Certain features may be modeled using a combination of clustering and classification.

In some implementations, ML may be employed for operational scheduling in a service environment. For example, deep learning techniques may be employed that account for inputs and/or outputs produced by multiple intermediary systems. Different processes within a call center or other service environment may each expend considerable effort spent operational scheduling, such as determining which SRs are to be staffed at what times to be available to service individuals. Traditionally, such scheduling as focused on the forecasting of expected traffic (e.g., number of calls) into the service environment, based on past history and/or trends exhibited for certain queues or related to certain support issues. Such traffic estimates may then be used to determine the staff needed at various times. Such traditional techniques are less useful in current service environments, given that individuals may contact the service environment (e.g., call into a call center) at different stages of their problem resolution process. For example, an individual may begin trying to resolve a problem through a web site or help features of a mobile app, and the individual may later contact a call center or request a live chat session with a SR with the individual runs into a problem or question they cannot resolve themselves. Individuals may ask for help with a portion of a process to resolve an issue, instead of the whole process. Accordingly, applying traditional methods to determine staff scheduling in a current service environment may lead to overstaffing or understaffing.

In some implementations, the model(s) 118 may be developed to predict staffing needs within the service environment, such as the number of type (e.g., issue expertise) of SRs that are to be available for servicing individuals during various time periods. Such modeling may identify patterns, such as a pattern in the change in demand for support in a call center following changes to an app or web page. Implementations provide a forecast of the activities that individuals are performing through the various (e.g., online) transactional services provided by an organization, and such a forecast is used to determine the staffing of a service environment at any given time. Model(s) may be developed that calibrate one or more organizational (e.g., business) functions that have an impact on why and/or when individuals may contact the call center or other service environment. For example, the models may predict a number or frequency of individual support requests that may occur in response to a change of expiration date on a credit card, a change of interest rate on accounts, and so forth. The models may also predict the number or frequency of support requests that may occur in response to external events, such as weather events, financial market events, world or local news events, and so forth. The number of expected transactions (e.g., calls into a call center) may be modeled through ML techniques. The particular characteristics of such transactions may also be modeled, such as the number of support requests that are submitted digitally (e.g., through web site or app) versus non-digitally (e.g., through a telephonic call center), the number of support requests to human SRs versus virtual SRs, and so forth. To model based on new organizational (e.g., business) functions for which there is no historical data available, clustering may be employed to model based on a reason that transactions occur instead of a history of the occurrence of such transactions. Modeling may employ any one of, or a combination of, regression, classification, clustering, and/or other ML techniques.

Figure 3:
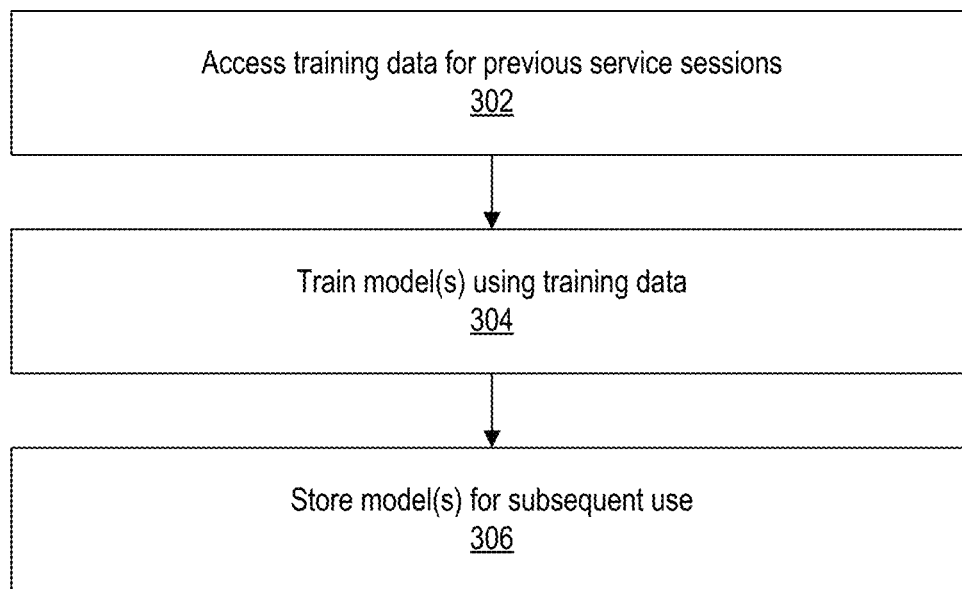
FIG. 3 depicts a flow diagram of an example process for providing model(s) for determining metric(s), according to implementations of the present disclosure.

FIG. 3 depicts a flow diagram of an example process for providing model(s) 118 for determining metric(s) 120, according to implementations of the present disclosure. Operations of the process may be performed by the analysis module(s) 116, the ML module(s) 122, the SR application 110, and/or other software module(s) executing on the analysis device(s) 114, the SR device 108, and/or elsewhere.

Training data 124 may be accessed (302). As described above, in some instances the training data 124 is labeled data associated with previous service sessions, such as session records and associated survey results. The model(s) 118 may be trained (304) or otherwise developed based on the training data 124, as described above. The model(s) 118 may then be stored (306) for subsequent use in predicting metric(s) 120 corresponding to survey score(s) 206.

Figure 4:
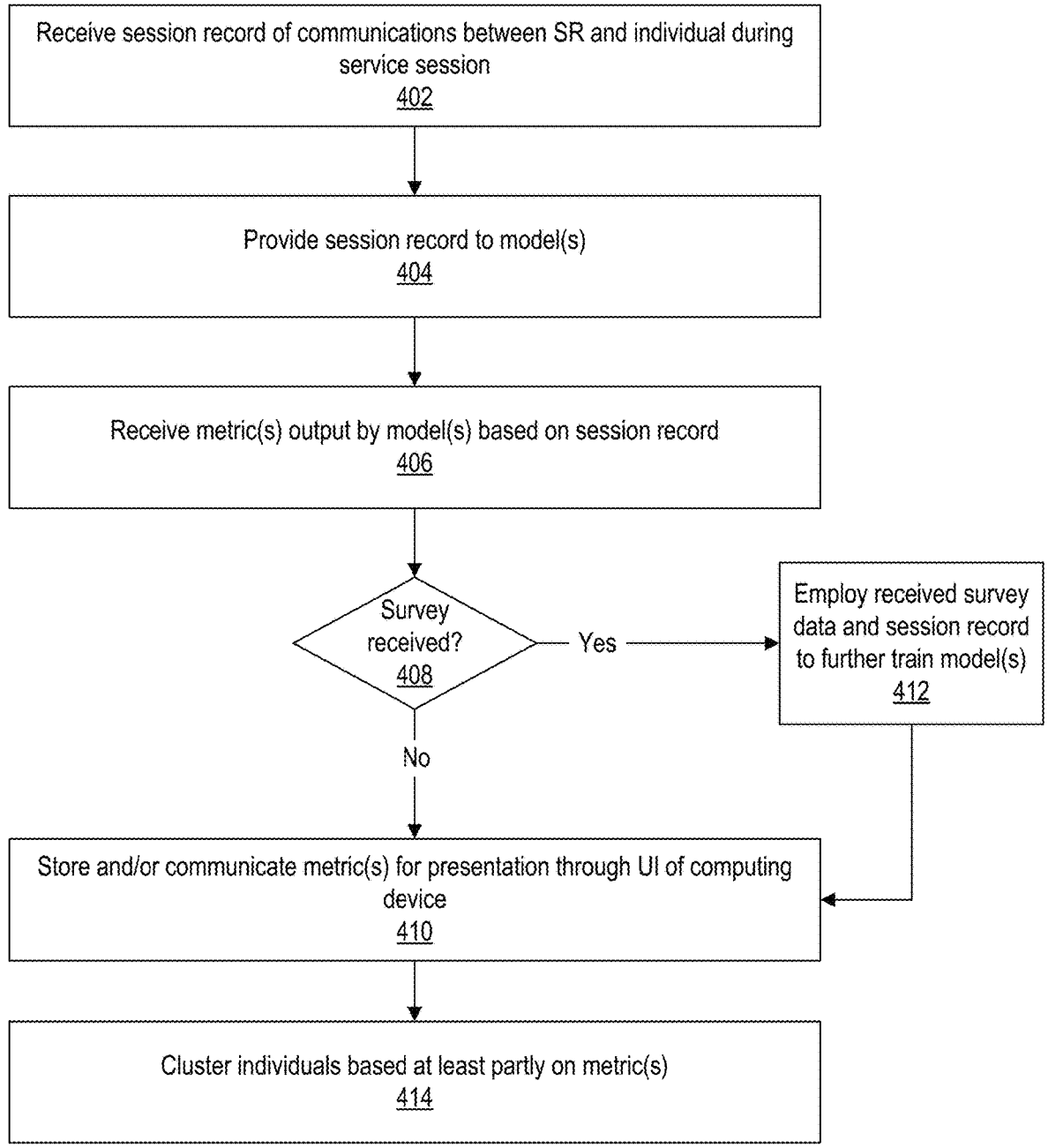
FIG. 4 depicts a flow diagram of an example process for determining metric(s) for service session(s) using the model(s), according to implementations of the present disclosure.

FIG. 4 depicts a flow diagram of an example process for determining metric(s) 120 for service session(s) 106 using the model(s) 118, according to implementations of the present disclosure. Operations of the process may be performed by the analysis module(s) 116, the ML module(s) 122, the SR application 110, and/or other software module(s) executing on the analysis device(s) 114, the SR device 108, and/or elsewhere.

The session record 112 of a service session 106 may be received (402). As described above, the service record 112 of a service session 106 may describe communication(s) between a SR 102 and an individual 104 during the service session 106. A service record 112 may describe a complete session 106 or a portion of a session 106. The session record 112 may be provided (404) as input to the model(s) 118 that were previously developed and stored. The metric(s) 120 output by the model(s) 118 based on the session record 112 may be received (406). In some implementations, a determination may be made (408) whether a survey has also been received from an individual 104 for this particular service session 112. If not, the metric(s) 120 may be stored and/or communicated (410) for presentation through a UI of a computing device, such as the SR device 108 or other computing device. In instances where a survey has been received, the received survey data and associated session record may be employed (412) as training data to further train (e.g., refine) the model(s) 118, by comparing the predicted metric(s) 120 to the actual received survey score(s) 206. The metric(s) 120 may be stored and/or communicated for presentation (410). Model(s) 118 (e.g., once sufficiently trained and developed to provide accurate estimates) may also be employed to retroactively generate metric(s) 120 for historical session record(s) 112 for which a survey was not initially completed by the serviced individual.

In some implementations, the individuals 114 are clustered (414) based at least partly on their metric(s). For example, after metric(s) have been determined for the individual, a cluster may be determined for that individual, such that individuals in the cluster exhibit similar values for various metric(s). Such clustering is described further below.

Figure 6:
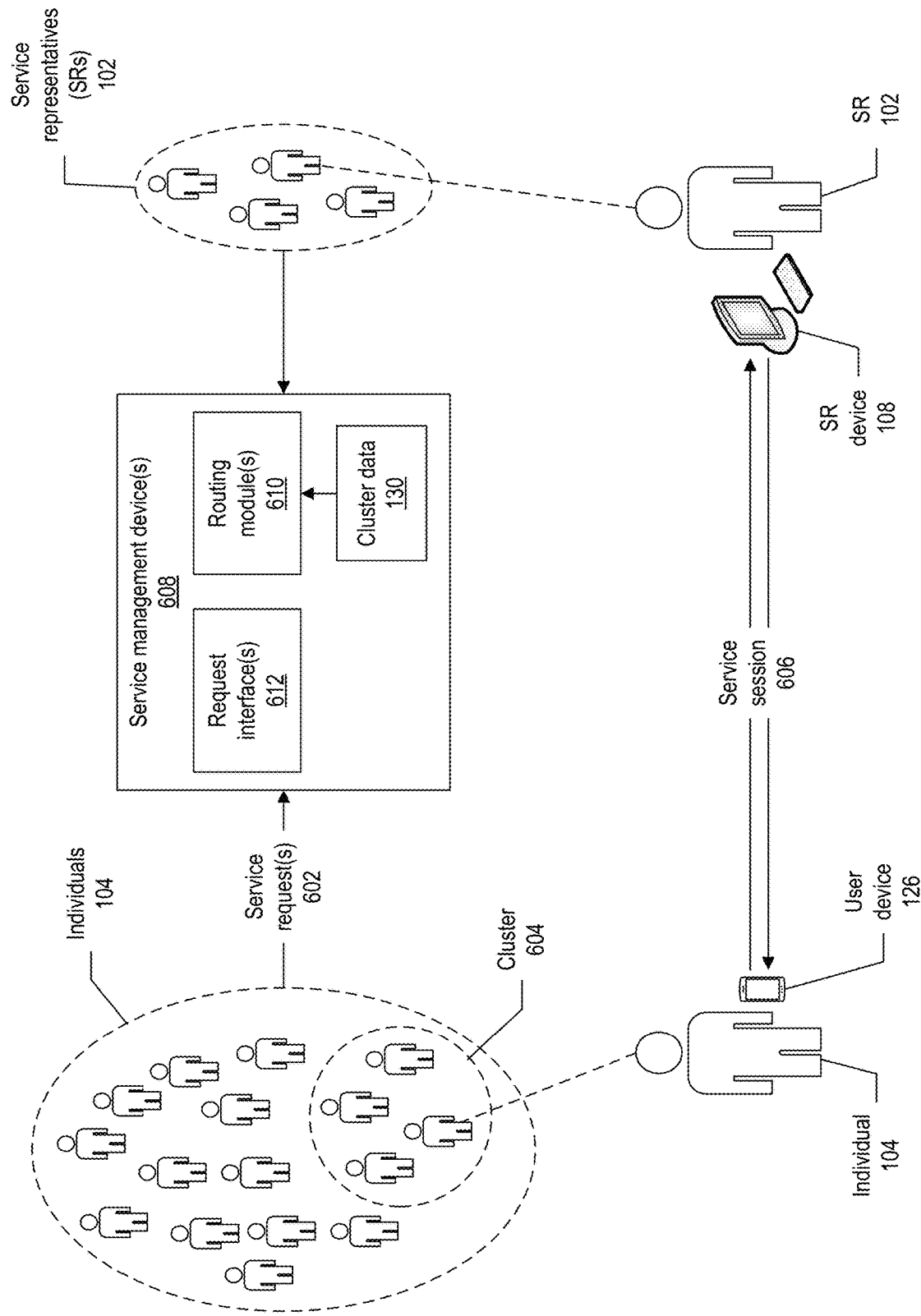
FIG. 6 depicts an example system for routing service requests in a service environment, according to implementations of the present disclosure.

FIG. 6 depicts an example system for routing service requests 602 in a service environment, according to implementations of the present disclosure. As used herein, routing is a process by which one or more SRs 102 in the service environment are selected to handle an incoming service request received within the service environment. Routing can also include initiating the service session between the selected SR(s) 102 and the individual who submitted the incoming service request, to allow the SR(s) to interact with the requesting individual, provide assistance and/or answer questions regarding products and/or services, and so forth.

As described above, service requests may be received through any suitable communication channel, including telephone calls, VOIP calls, text messages, text chat requests, and so forth. The service request may be routed to a SR, and the SR may respond to the initial request with a voice response, text response, or otherwise. In some instances, the SR may respond to the service request through the same communication channel as that used by the individual to submit the service request. Accordingly, the service session may be conducted through the communication channel initially used by the individual. For example, the individual may call into a service center using their telephone, a VOIP application, or otherwise. The call may be routed to a particular SR, who may then conduct the service session with the individual using the telephone connection, VOIP connection, or otherwise. In other examples, the individual may contact a service center through video chat, instant messaging (IM), social media messaging, email, or through other communication channels, and the service session may be conducted through the initially selected communication channel.

As shown in the example of FIG. 6, a plurality of individuals 102 may each employ a user device 104 to generate a service request 106. The service requests may be communicated, over one or more networks, to one or more service management devices 608 that perform operations to provide and maintain the service environment. The service management device(s) 608 may include any suitable number and type of computing devices, such as server computers, distributed computing devices (e.g., cloud servers), network servers, network gateways, front end servers, back end servers, and so forth. The service management device(s) 608 can execute one or more routing modules 610 that determine how to route each incoming service request 602.

A service request 602 from an individual 102 may be received by one or more request interfaces 612 provided by the service management device(s) 608. As described above, implementations support various communication channels. The submission of a service request 602, and/or the particular request interface 612 that receives the service request 602, may vary based on the communication channel used by the individual 102 to send the service request 602. For example, an individual 102 may use a voice telephony network or data network to make a telephone and/or VOIP call to a call center. In such examples, the request interface 612 may enable the individual 102 may navigate through a sequence of audio menus and/or communicate with an interactive voice response (IVR) system to generate a service request 602 based on the individual's speech inputs and/or inputs through a telephone numeric keypad. As another example, an individual 102 may access a request interface 612 through an online application and/or web application to submit a service request 602 for a real time text chat session, video chat session, and/or audio chat session. In some instances, the individual 102 may send a service request 602 in the form of an email to an address associated with the service environment, and the request interface 612 may be configured to handle email communications arranged according to a version of internet message access protocol (IMAP), simple mail transfer protocol (SMTP), or some other protocol. In some instances, the individual 102 may send a service request 602 in the form of a text message to a phone number associated with the service environment, and the request interface 612 may be configured to handle text messages sent via a version of short message service (SMS), multimedia messaging service (MMS), and/or other suitable messaging protocol.

In any of these situations, and/or other types of service environments, the cluster-based routing of the service request described herein can enable the individual to bypass the default handling the service request, and be connected directly to at least one SR who is suitable to handle the individual's service request. For example, if a service request is received from an individual who has already been placed in a cluster according to their metric(s) and/or other characteristics, the individual may call into the IVR system of the service environment and, instead of going through the typical, default series of selections in the IVR tree, the individual may be routed directly to an SR who is selected based at least partly on the cluster of the individual. In some examples, clustering may be based on products/services as well as metric(s). In such instances, the default handling of the service request may proceed until a determination is made of which particular product or service is the topic of the service request. At that point, the appropriate cluster for the individual and product/service is determined, and the routing is performed based on the determined cluster.

The request interface 612 that receives the service request 602 may forward a service request 602 to the routing module(s) 610 executing on the service management device(s) 608. The routing module(s) 610 may access the cluster data 130 generated on the analysis device(s), and determine a particular cluster 604 that includes the individual. In instances where the individual has been placed into a cluster 604 based on some other factor in addition to metric(s), such as a product, service, demographic characteristic(s), location, and so forth, the cluster may be determined that corresponds to the individual and the appropriate other factor. For example, an individual may be placed in a first cluster for metric similarity with respect to calls regarding auto insurance, and in a second cluster for metric similarity with respect to calls regarding home insurance. If the individual is calling for service regarding auto insurance, the first cluster can be used for routing, and if the individual is calling for service regarding home insurance, the second cluster can be used. In general, an individual may be placed into any suitable number of clusters to be used for routing decisions.

In response to a routing decision that selects a particular SR 102 to handle a service request 602 from a particular individual 104, as described herein, a service session 606 may be initiated to enable communications between the SR 102 and the individual 104 over the communication channel associated with the service request 602. The service session may continue until one or both parties terminate the session, and/or until the individual's problem, question, or issue is resolved. In some implementations, the service management device(s) 608 may execute one or more session management modules that initiate, terminate, and/or otherwise manage service sessions between SRs and individuals.

Figure 7:
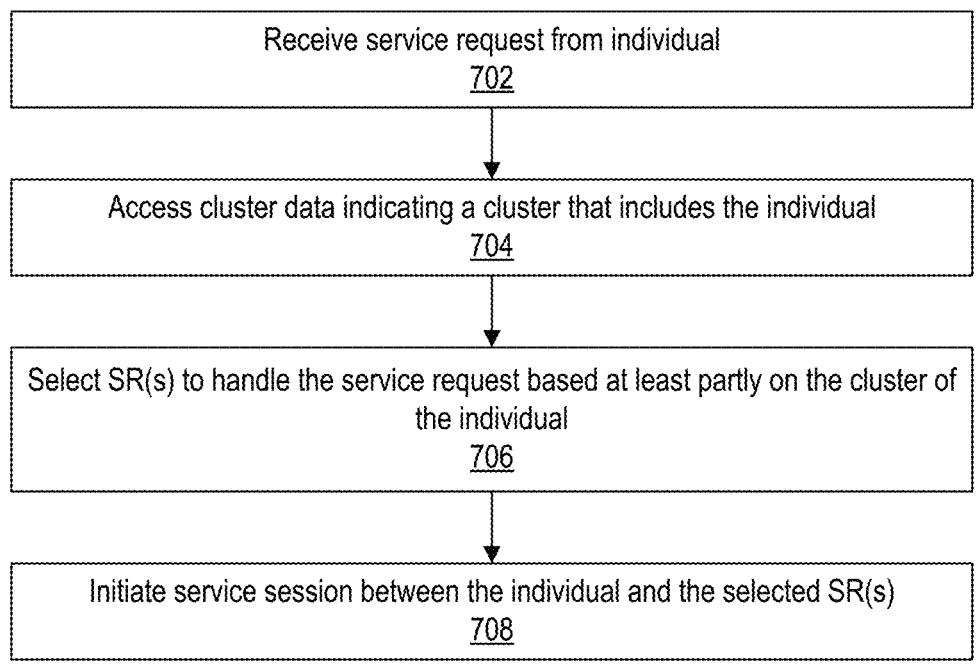
FIG. 7 depicts a flow diagram of an example process for routing service requests in a service environment, according to implementations of the present disclosure.

FIG. 7 depicts a flow diagram of an example process for routing service requests 602 in a service environment, according to implementations of the present disclosure. Operations of the process can be performed by one or more of the routing module(s) 610, and/or other software module(s) executing on the service management device(s) 608 or elsewhere.

A service request is received (702) from an individual, as described above. The cluster data 130 is accessed (704). The cluster data 130 can describe one or more clusters that include or are otherwise associated with the individual. One or more particular SRs are selected (706) to handle the service request from the individual. Such selection can be based at least partly on the cluster of the individual. The service session is then initiated (708) between the individual and the selected SR(s).

In some implementations, the cluster-based routing selects the SR(s) to handle a request based on the particular cluster of the individual who submitted the request. For example, the routing process can select SR(s) who previously interacted with individuals in the cluster, and for which the generated metrics based on those interactions are high (e.g., above a threshold value) for particular individual metric(s) and/or for an average of the metrics. Accordingly, cluster-based routing seeks to provide a positive user experience for a service session by selecting SR(s) that previously created a positive (e.g., high, above-threshold metrics) for the individual themselves and/or for other individuals that exhibit similar metrics to the calling individual.

Figure 8:
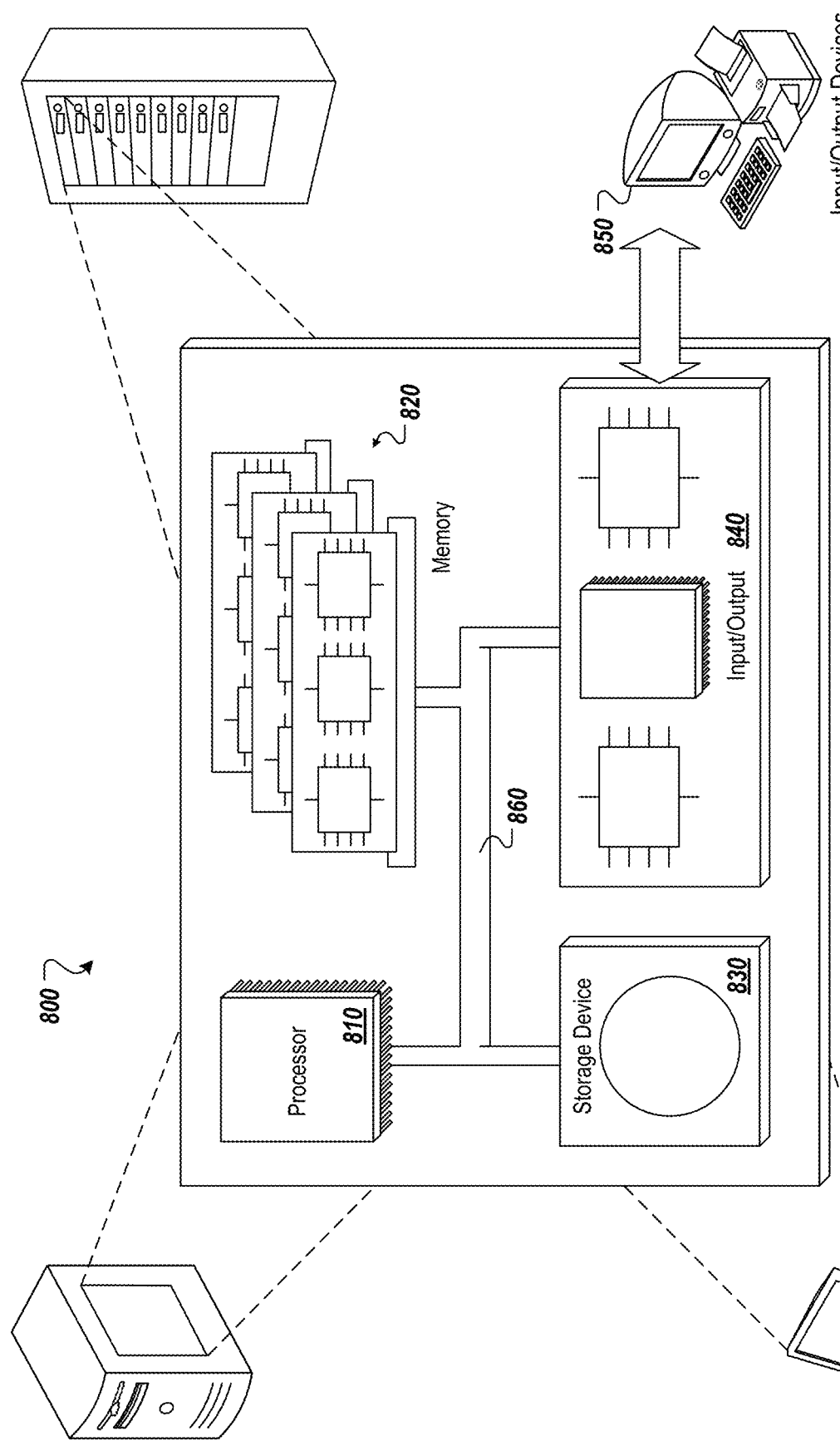
FIG. 8 depicts an example computing system, according to implementations of the present disclosure.

FIG. 8 depicts an example computing system, according to implementations of the present disclosure. The system 800 may be used for any of the operations described with respect to the various implementations discussed herein. For example, the system 800 may be included, at least in part, in one or more of the SR device 108, the analysis device(s) 114, the service management device(s) 608, the user device 126, and/or other computing device(s) or system(s) described herein. The system 800 may include one or more processors 810, a memory 820, one or more storage devices 830, and one or more input/output (I/O) devices 850 controllable through one or more I/O interfaces 840. The various components 810, 820, 830, 840, or 850 may be interconnected through at least one system bus 860, which may enable the transfer of data between the various modules and components of the system 800.

The processor(s) 810 may be configured to process instructions for execution within the system 800. The processor(s) 810 may include single-threaded processor(s), multi-threaded processor(s), or both. The processor(s) 810 may be configured to process instructions stored in the memory 820 or on the storage device(s) 830. The processor(s) 810 may include hardware-based processor(s) each including one or more cores. The processor(s) 810 may include general purpose processor(s), special purpose processor(s), or both.

The memory 820 may store information within the system 800. In some implementations, the memory 820 includes one or more computer-readable media. The memory 820 may include any number of volatile memory units, any number of non-volatile memory units, or both volatile and non-volatile memory units. The memory 820 may include read-only memory, random access memory, or both. In some examples, the memory 820 may be employed as active or physical memory by one or more executing software modules.

The storage device(s) 830 may be configured to provide (e.g., persistent) mass storage for the system 800. In some implementations, the storage device(s) 830 may include one or more computer-readable media. For example, the storage device(s) 830 may include a floppy disk device, a hard disk device, an optical disk device, or a tape device. The storage device(s) 830 may include read-only memory, random access memory, or both. The storage device(s) 830 may include one or more of an internal hard drive, an external hard drive, or a removable drive.

One or both of the memory 820 or the storage device(s) 830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 800. In some implementations, the CRSM may include a data store that provides storage of computer-readable instructions or other information in a non-transitory format. The CRSM may be incorporated into the system 800 or may be external with respect to the system 800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 810 and the memory 820 may be supplemented by, or incorporated into, one or more application-specific integrated circuits (ASICs).

The system 800 may include one or more I/O devices 850. The I/O device(s) 850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 850 may also include one or more output devices such as a display, LED(s), an audio output device (e.g., a speaker), a printer, a haptic output device, and so forth. The I/O device(s) 850 may be physically incorporated in one or more computing devices of the system 800, or may be external with respect to one or more computing devices of the system 800.

The system 800 may include one or more I/O interfaces 840 to enable components or modules of the system 800 to control, interface with, or otherwise communicate with the I/O device(s) 850. The I/O interface(s) 840 may enable information to be transferred in or out of the system 800, or between components of the system 800, through serial communication, parallel communication, or other types of communication. For example, the I/O interface(s) 840 may comply with a version of the RS-232 standard for serial ports, or with a version of the IEEE 1284 standard for parallel ports. As another example, the I/O interface(s) 840 may be configured to provide a connection over Universal Serial Bus (USB) or Ethernet. In some examples, the I/O interface(s) 840 may be configured to provide a serial connection that is compliant with a version of the IEEE 1394 standard.

The I/O interface(s) 840 may also include one or more network interfaces that enable communications between computing devices in the system 800, or between the system 800 and other network-connected computing systems. The network interface(s) may include one or more network interface controllers (NICs) or other types of transceiver devices configured to send and receive communications over one or more networks using any network protocol.

Computing devices of the system 800 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   receiving, by the at least one processor, a session record of communications between a service representative (SR) and a customer during a service session in a service environment;
   providing, by at least one processor, the session record as input to at least one computer-processable model that determines, based on the session record, a prediction of at least one survey score that would likely be submitted by the customer for the service session;
   determining, by the at least one processor, a cluster for the customer based at least partly on the prediction of the at least one survey score, the cluster including a plurality of other customers;
   in response to receiving a subsequent service request from the customer within the service environment, selecting, by the at least one processor, at least one SR based on determining that an average survey score for customers in the cluster exceeds a threshold value, the average survey score being an average of survey scores that are determined, by the at least one model, based on session records of communications between the customers and the at least on SR; and
   responsive to identifying that the customer is included in the cluster, bypassing a default interactive voice response process by directly initiating, by the at least one processor, a subsequent service session between the customer and the at least one SR that is selected based on the cluster of the customer.

2. The method of claim 1, wherein the cluster is further determined based on the plurality of other customers in the cluster having a similarity in one or more of:
   a product discussed by the plurality of other customers during service sessions;
   a location of the plurality of other customers; and
   a characteristic of the plurality of other customers.

3. The method of claim 1, wherein the at least one SR is selected based on determining that respective customers in the cluster each have a respective survey score that exceeds a threshold value and that is determined, by the at least one model, based on a respective session record of communications between the respective customer and the at least one SR.

4. The method of claim 1, wherein:
   the service session is an audio call between the SR and the customer; and
   the session record includes an audio record of at least a portion of the audio call.

5. The method of claim 1, further comprising:
   developing, by at least one processor, the at least one model based on training data that describes, for each of a plurality of previous service sessions:
   a previous session record of communications during a respective previous service session; and
   at least one survey score provided to rate the respective previous service session.

6. The method of claim 5, further comprising:
   receiving, by at least one processor, the at least one survey score provided, by the customer, to rate the service session; and employing, by at least one processor, the at least one survey score and the session record to further train the at least one model.

7. The method of claim 1, wherein:
the at least one model is trained to identify a plurality of features present in the session record; and
the prediction of each of the at least one survey score is determined based on a strength of one or more corresponding features present in the session record.

8. The method of claim 7, wherein the at least one model is a deep learning model in which a separate model is trained to identify each of the plurality of features.

9. The method of claim 1, wherein:
the at least one model is a concatenated model that is a combination of a language model and an acoustic model;
the language model is output from a language classifier recurrent neural network (RNN); and
the acoustic model is output from an acoustic feature layer convolutional neural network (CNN).

10. The method of claim 1, further comprising:
receiving a completed survey from the customer;
comparing the completed survey with the prediction of the at least one survey score for the customer to provide training feedback data; and
employing the training feedback data to refine the at least one computer-processable model.

11. A system, comprising:
at least one processor; and
a memory communicatively coupled to the at least one processor, the memory storing instructions which, when executed by the at least one processor, cause the at least one processor to perform operations comprising:
receiving a session record of communications between a service representative (SR) and a customer during a service session in a service environment;
providing the session record as input to at least one computer-processable model that determines, based on the session record, a prediction of at least one survey score that would likely be submitted by the customer for the service session;
determining a cluster for the customer based at least partly on the prediction of the at least one survey score, the cluster including a plurality of other customers;
in response to receiving a subsequent service request from the customer within the service environment, selecting at least one SR based on determining that an average survey score for customers in the cluster exceeds a threshold value, the average survey score being an average of survey scores that are determined, by the at least one model, based on session records of communications between the customers and the at least one SR; and
responsive to identifying that the customer is included in the cluster, bypassing a default interactive voice response process by directly initiating a subsequent service session between the customer and the at least one SR that is selected based on the cluster of the customer.

12. The system of claim 11, wherein the cluster is further determined based on the plurality of other customers in the cluster having a similarity in one or more of:
a product discussed by the plurality of other customers during service sessions;
a location of the plurality of other customers; and
a characteristic of the plurality of other customers.

13. The system of claim 11, wherein the at least one SR is selected based on determining that respective customers in the cluster each have a respective survey score that exceeds a threshold value and that is determined, by the at least one model, based on a respective session record of communications between the respective customer and the at least one SR.

14. The system of claim 11, wherein:
the service session is an audio call between the SR and the customer; and
the session record includes an audio record of at least a portion of the audio call.

15. The system of claim 11, the operations further comprising:
developing the at least one model based on training data that describes, for each of a plurality of previous service sessions:
a previous session record of communications during a respective previous service session; and
at least one survey score provided to rate the respective previous service session.

16. The system of claim 15, the operations further comprising:
receiving the at least one survey score provided, by the customer, to rate the service session; and
employing the at least one survey score and the session record to further train the at least one model.

17. The system of claim 11, wherein:
the at least one model is trained to identify a plurality of features present in the session record; and
the prediction of each of the at least one survey score is determined based on a strength of one or more corresponding features present in the session record.

18. The system of claim 11, wherein:
the at least one model is a concatenated model that is a combination of a language model and an acoustic model;
the language model is output from a language classifier recurrent neural network (RNN); and
the acoustic model is output from an acoustic feature layer convolutional neural network (CNN).

19. The system of claim 11, wherein the operations further comprise:
receiving a completed survey from the customer;
comparing the completed survey with the prediction of the at least one survey score for the customer to provide training feedback data; and
employing the training feedback data to refine the at least one computer-processable model.

20. One or more non-transitory computer-readable media storing instructions which, when executed by at least one processor, cause the at least one processor to perform operations comprising:
receiving a session record of communications between a service representative (SR) and a customer during a service session in a service environment;
providing the session record as input to at least one computer-processable model that determines, based on the session record, a prediction of at least one survey score that would likely be submitted by the customer for the service session;
determining a cluster for the customer based at least partly on the prediction of the at least one survey score, the cluster including a plurality of other customers;

in response to receiving a subsequent service request from the customer within the service environment, selecting at least one SR based on determining that an average survey score for customers in the cluster exceeds a threshold value, the average survey score being an average of survey scores that are determined, by the at least one model, based on session records of communications between the customers and the at least one SR; and responsive to identifying that the customer is included in the cluster, bypassing a default interactive voice response process by directly initiating a subsequent service session between the customer and the at least one SR that is selected based on the cluster of the customer.

* * * * *